United States Patent
Jung

(10) Patent No.: US 10,947,858 B2
(45) Date of Patent: Mar. 16, 2021

(54) SEALING STRUCTURE FOR BLADE TIP AND GAS TURBINE HAVING THE SAME

(71) Applicant: DOOSAN HEAVY INDUSTRIES & CONSTRUCTION CO., LTD., Changwon-si (KR)

(72) Inventor: Jin Sol Jung, Busan (KR)

(*) Notice: Subject to any disclaimer, the term of this patent is extended or adjusted under 35 U.S.C. 154(b) by 106 days.

(21) Appl. No.: 16/102,726

(22) Filed: Aug. 14, 2018

(65) Prior Publication Data
US 2019/0078455 A1 Mar. 14, 2019

(30) Foreign Application Priority Data
Sep. 12, 2017 (KR) .................. 10-2017-0116644

(51) Int. Cl.
*F01D 11/08* (2006.01)
*F02C 7/28* (2006.01)
(Continued)

(52) U.S. Cl.
CPC .......... *F01D 11/08* (2013.01); *F01D 5/20* (2013.01); *F01D 11/006* (2013.01); *F02C 7/28* (2013.01);
(Continued)

(58) Field of Classification Search
CPC . F01D 5/20; F01D 11/08; F01D 11/12; F01D 11/122; F01D 11/125; F01D 11/127; F05D 2240/307; F02C 7/28
See application file for complete search history.

(56) References Cited

U.S. PATENT DOCUMENTS

| | | | | |
|---|---|---|---|---|
| 5,997,251 A | * | 12/1999 | Lee | F01D 5/187 416/97 R |
| 6,027,306 A | * | 2/2000 | Bunker | F01D 5/20 415/115 |

(Continued)

FOREIGN PATENT DOCUMENTS

| EP | 2716870 A1 | 4/2014 |
|---|---|---|
| JP | 3844324 B2 | 11/2006 |

(Continued)

OTHER PUBLICATIONS

Korean Office Action issued by the Korean Intellectual Property Office dated Jul. 24, 2018 in connection with Korean Patent Application No. 10-2017-0116644.

*Primary Examiner* — Courtney D Heinle
*Assistant Examiner* — Sang K Kim
(74) *Attorney, Agent, or Firm* — Harvest IP Law, LLP

(57) ABSTRACT

A sealing structure for a blade tip is provided to effect a prevention of working fluid from leaking through a clearance established between an inner circumferential surface of a stator and an end of a blade. The sealing structure includes a blade of a bucket mounted on an outer circumferential surface of a rotor disk coupled along a longitudinal direction to a rotor disposed inside a stator; and a tip seal having a multi-row structure formed on an end of the blade and provided to prevent working fluid from leaking through a clearance established between an inner circumferential surface of the stator and the end of the blade, wherein the tip seal comprises linear parts disposed at a predetermined angle, or perpendicular, relative to an axial direction of the rotor, each of the linear parts having a planarized end.

15 Claims, 13 Drawing Sheets

(51) Int. Cl.
    *F01D 11/00*     (2006.01)
    *F01D 5/20*     (2006.01)

(52) U.S. Cl.
    CPC .... *F05D 2240/307* (2013.01); *F05D 2240/55* (2013.01)

(56) References Cited

U.S. PATENT DOCUMENTS

| | | | |
|---|---|---|---|
| 8,313,287 B2* | 11/2012 | Little | F01D 5/187 415/173.1 |
| 9,464,536 B2* | 10/2016 | Zhang | F01D 11/122 |
| 2012/0230818 A1* | 9/2012 | Shepherd | F01D 5/20 415/208.1 |
| 2014/0186190 A1* | 7/2014 | Zelesky | F01D 5/187 416/97 R |
| 2015/0330228 A1* | 11/2015 | Quach | F01D 5/187 416/95 |
| 2018/0355732 A1* | 12/2018 | Hall | F01D 5/20 |

FOREIGN PATENT DOCUMENTS

| | | |
|---|---|---|
| JP | 6159151 B2 | 7/2017 |
| KR | 10-1730261 B1 | 4/2017 |

\* cited by examiner

[FIG. 1]
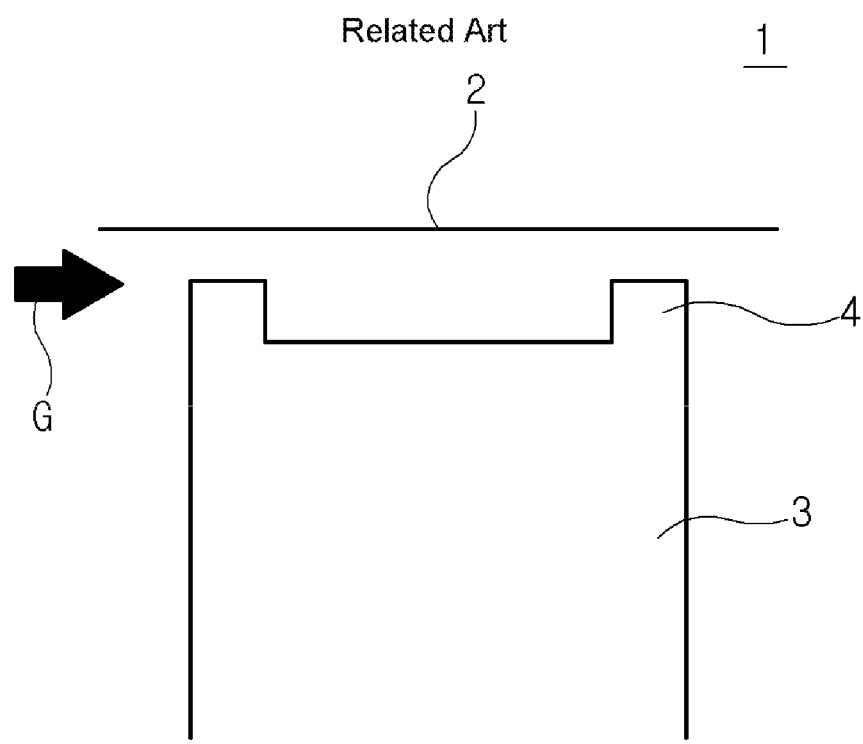

[FIG. 2]
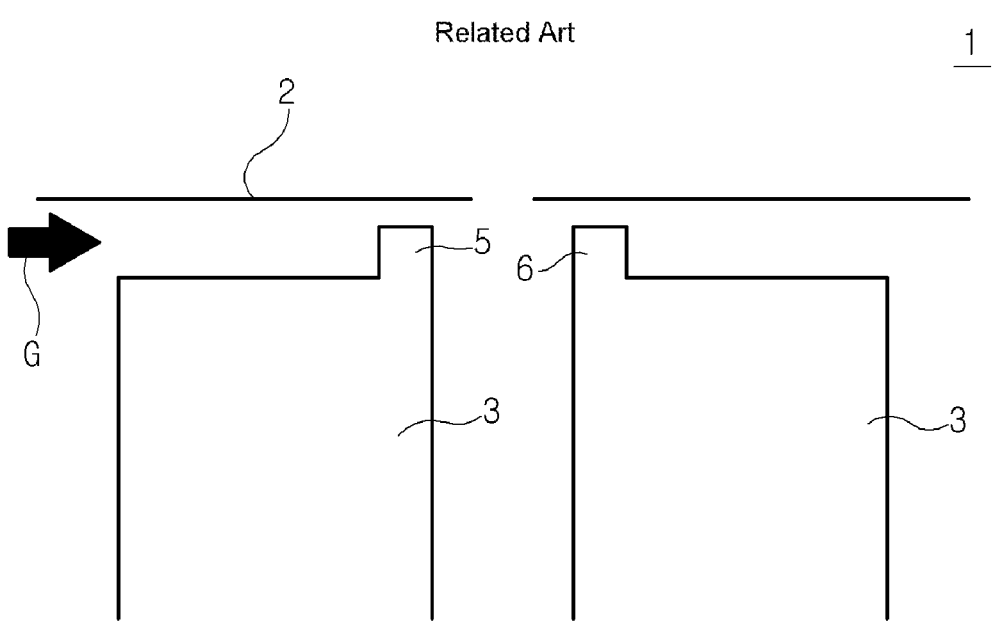

[FIG. 3]
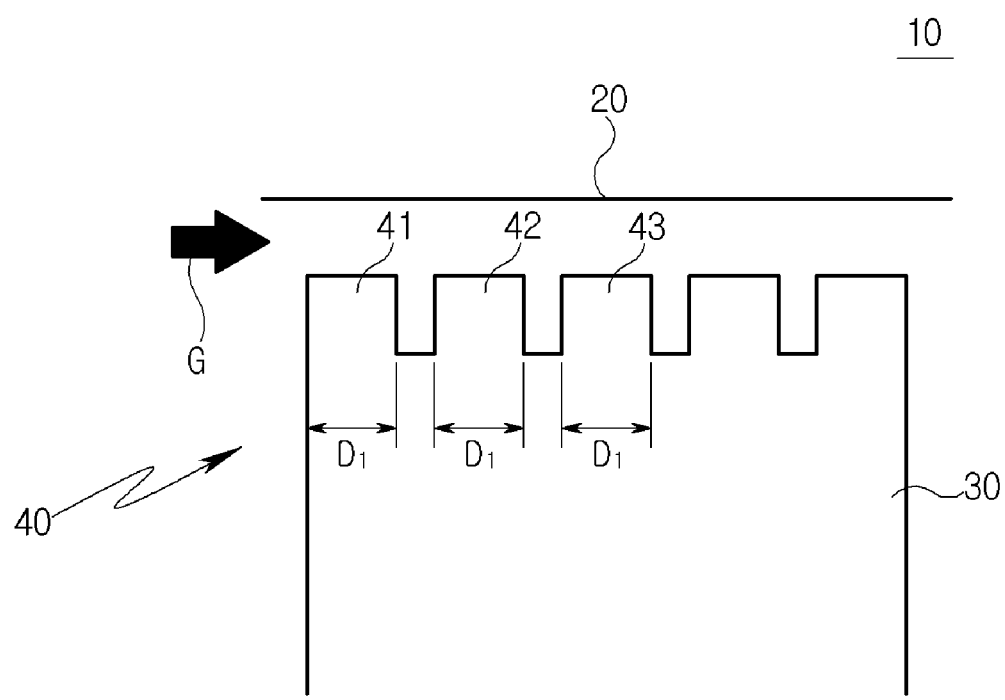

[FIG. 4]
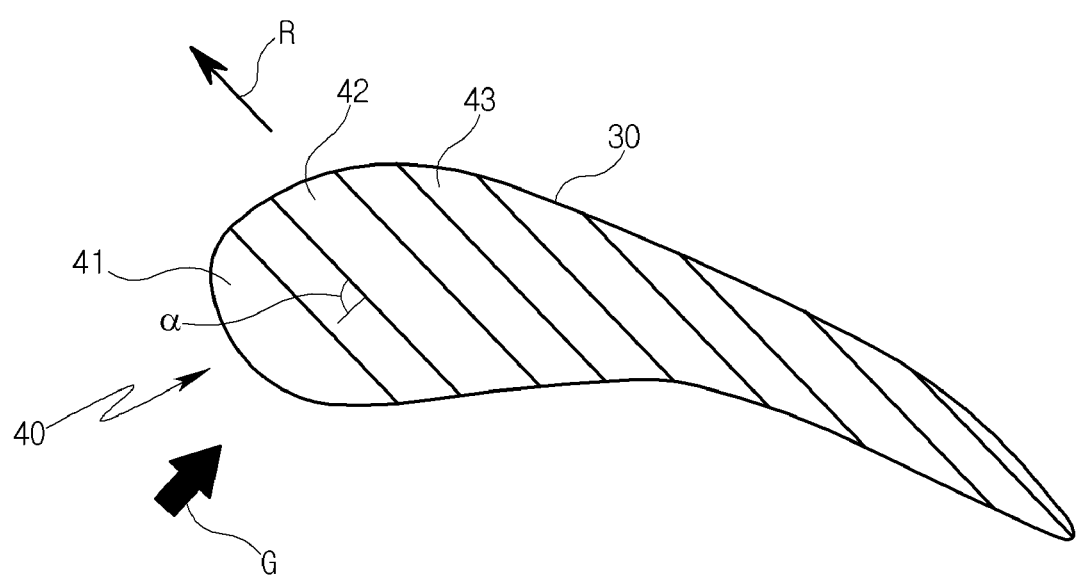

[FIG. 5]
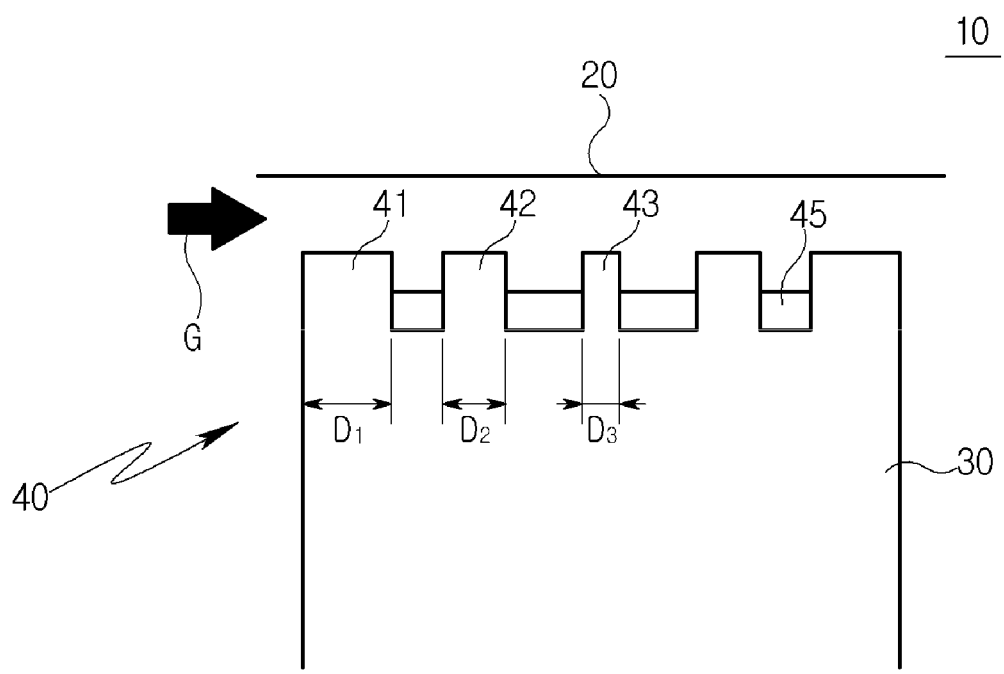

[FIG. 6]
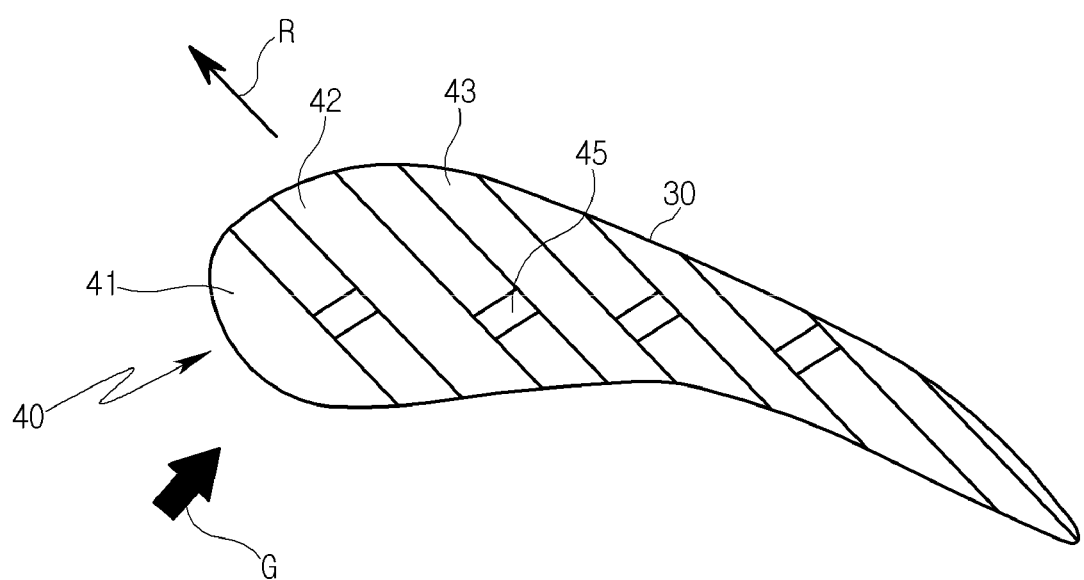

[FIG. 7]
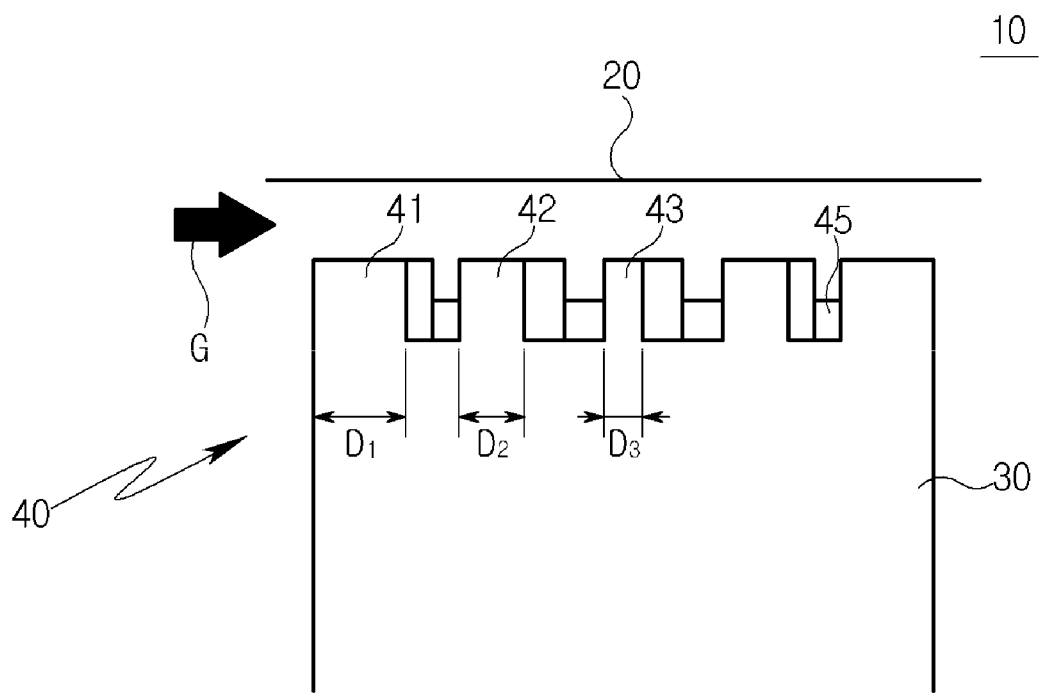

[FIG. 8]
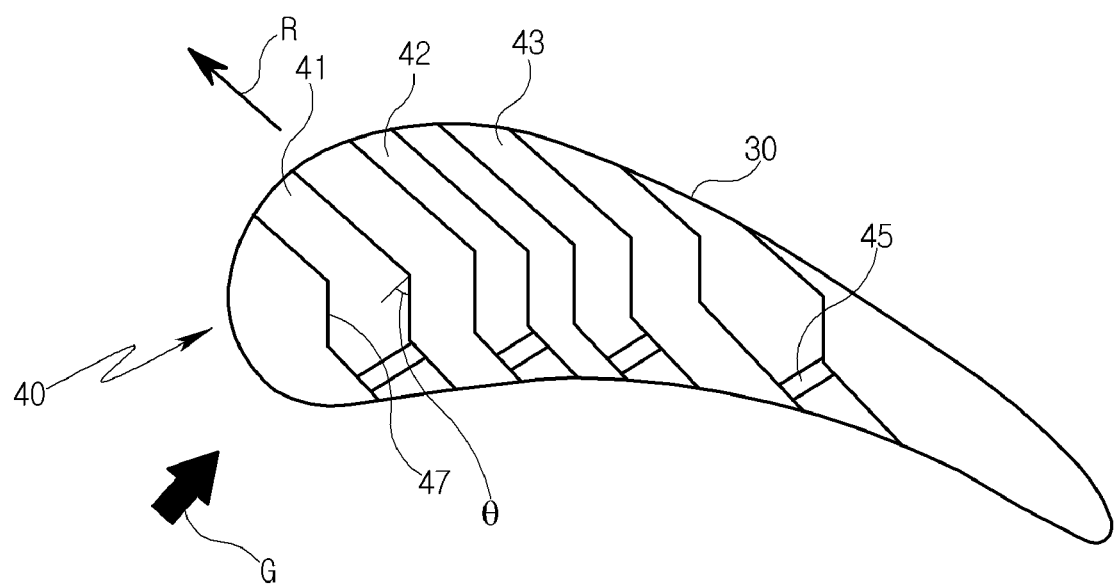

[FIG. 9]
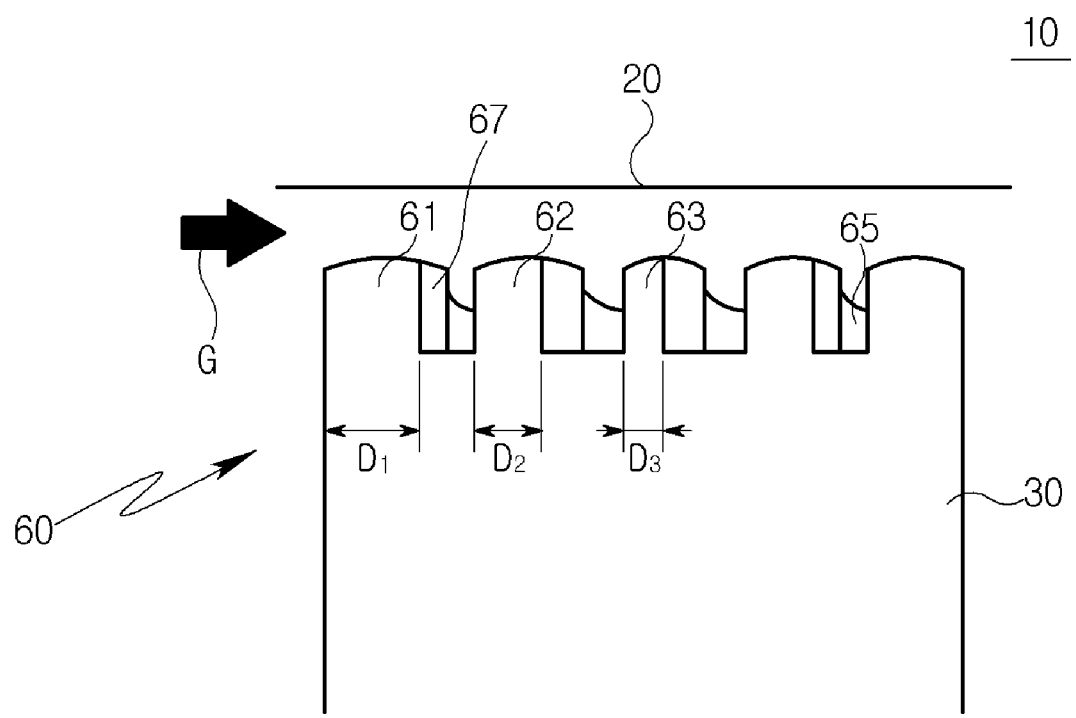

[FIG. 10]
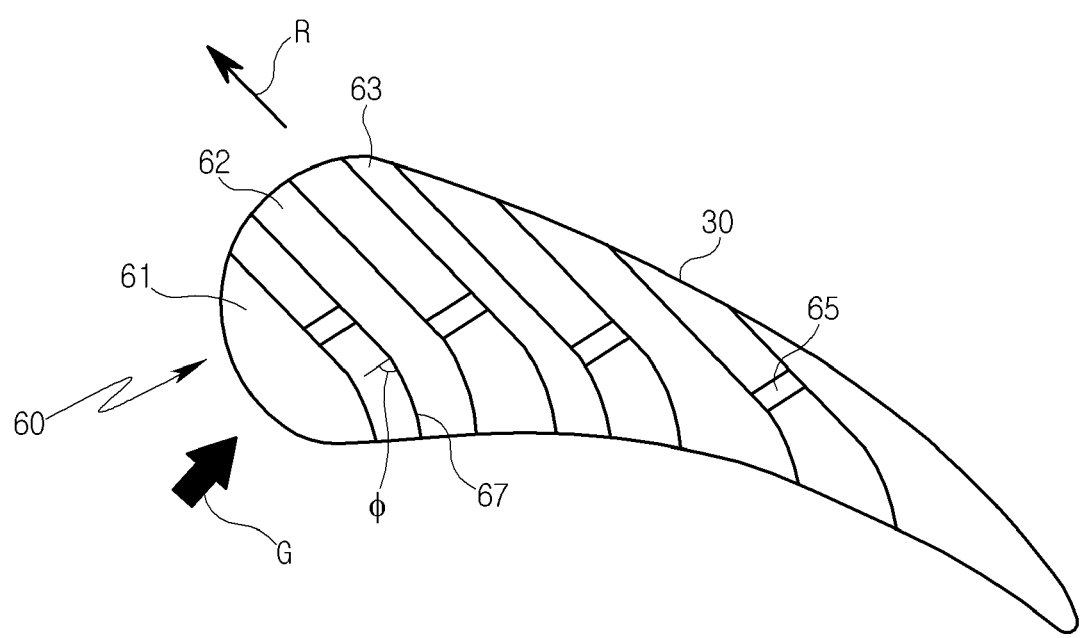

[FIG. 11]
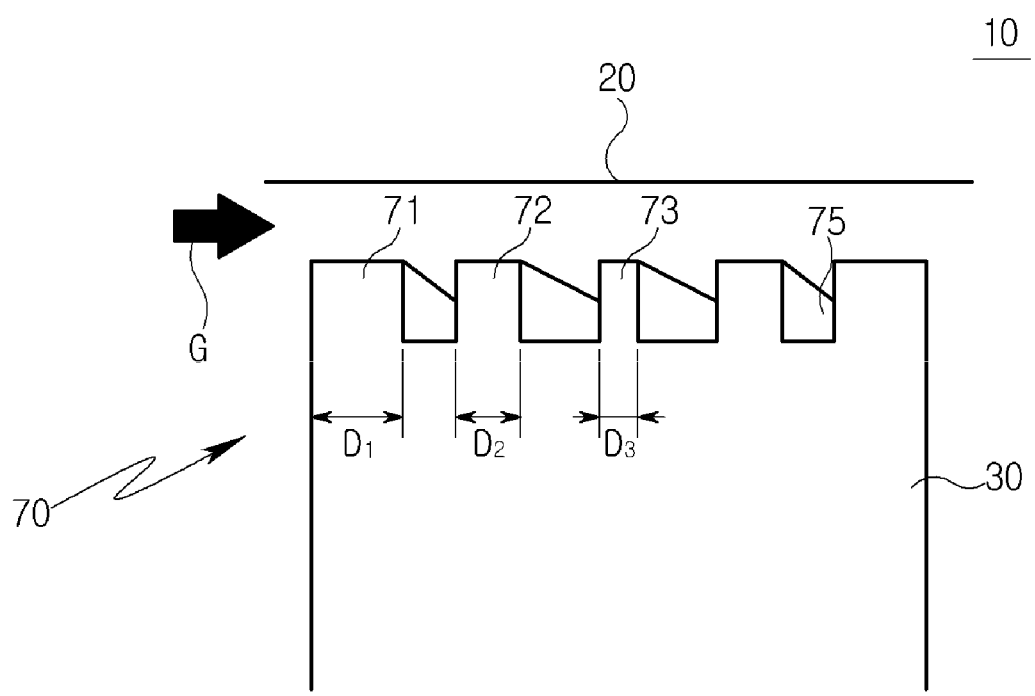

【FIG. 12】
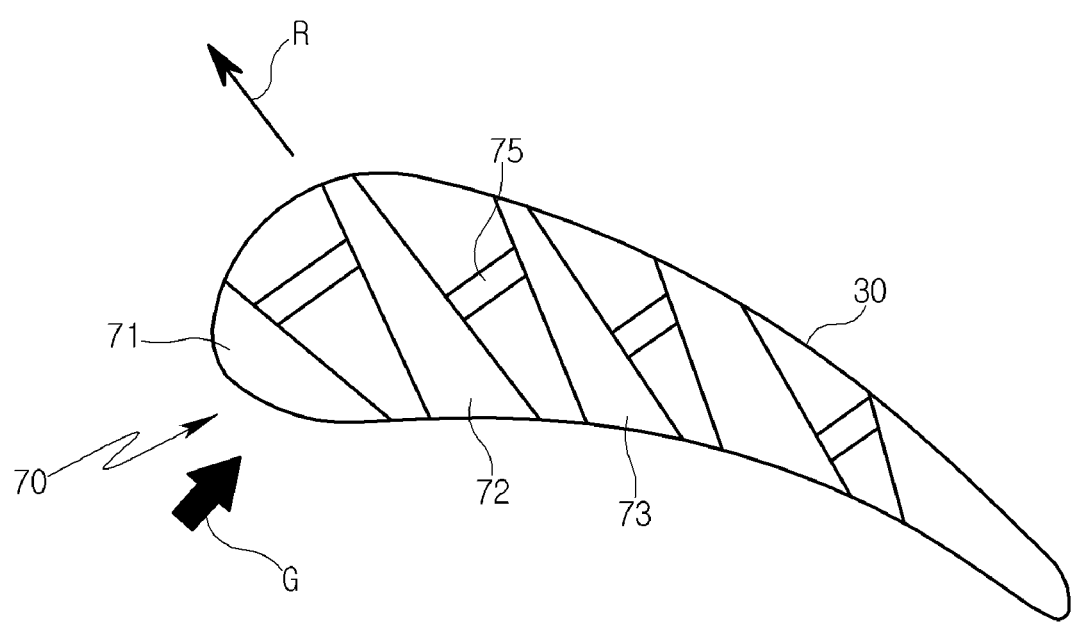

[FIG. 13]
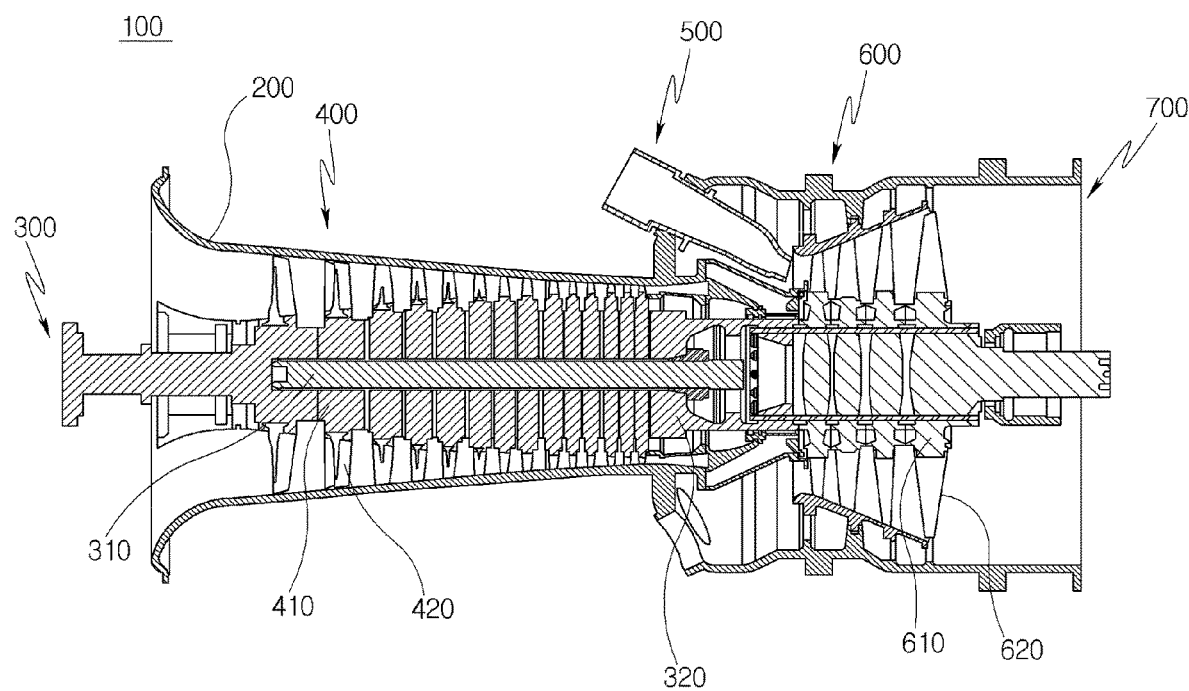

SEALING STRUCTURE FOR BLADE TIP AND GAS TURBINE HAVING THE SAME

CROSS-REFERENCE TO RELATED APPLICATIONS

This application claims priority to Korean Patent Application No. 10-2017-0116644, filed on Sep. 12, 2017, the disclosure of which is incorporated herein by reference in its entirety.

BACKGROUND OF THE DISCLOSURE

Field of the Disclosure

Exemplary embodiments of the present disclosure relate to a sealing structure for a blade tip, and more particularly, to a sealing structure for a blade tip for preventing working fluid from leaking through a clearance between an inner circumferential surface of a stator and an end of the blade tip of a bucket.

Description of the Related Art

A turbine is a machine which generates rotating force from impulsive force or reaction force using the flow of compressive fluid such as steam or gas. The turbine is classified into a steam turbine using steam, a gas turbine using high-temperature combustion gas, and so forth.

The gas turbine chiefly includes a compressor, a combustor, and a turbine. The compressor includes an air inlet into which air is introduced, and a plurality of compressor vanes and a plurality of compressor blades which are alternately provided in a compressor casing. The combustor is configured to mix fuel with air compressed by the compressor and ignite the mixture using a burner, thus generating high-temperature and high-pressure combustion gas. The turbine includes a plurality of turbine vanes and a plurality of turbine blades which are alternately arranged in a turbine casing.

Furthermore, a rotor is arranged so as to pass through central portions of the compressor, the combustor, the turbine, and an exhaust chamber. Opposite ends of the rotor are rotatably supported by bearings. A plurality of disks are fixed to the rotor, and the blades are respectively coupled to the corresponding disks. A drive shaft of a generator is coupled to an end of the rotor that is adjacent to the exhaust chamber.

The gas turbine does not have a reciprocating component such as a piston of a four-stroke engine. Therefore, mutually frictional components such as a piston-and-cylinder are not present, so that there are advantages in that there is little consumption of lubricant, the amplitude of vibration is markedly reduced unlike a reciprocating machine having high-amplitude characteristics, and high-speed driving is possible.

In the operation of a gas turbine having the above configuration, air compressed by the compressor is mixed with fuel, the mixture is combusted to generate high-temperature combustion gas, and the generated combustion gas is discharged to the turbine. The discharged combustion gas passes through the turbine vanes and the turbine blades and thus generates rotating force, by which the rotor is rotated. In this operation, sealing around a blade tip is an important technical issue.

FIG. 1 illustrates a sealing structure 1 in which a working fluid or gas G acts on a clearance between an inner circumferential surface of a stator 2 and an end of a tip 4 of a blade 3 of a bucket according to a contemporary technique. The stator 2 includes a casing, a vane, a diaphragm, etc. and is fixed, as a non-rotational element, and the blade tip 4 is a rotational element. To allow the rotational element to smoothly rotate, the blade tip 4 is spaced apart from the inner circumferential surface of the stator 2 by a predetermined distance (clearance).

In the operation process of the gas turbine, there is a problem in that working fluid may leak through a space between the end of the blade tip 4 and the inner circumferential surface of the stator 2. To address this, blade tips 4 may be respectively disposed on opposite ends of each blade 3 as in FIG. 1, or blade tips 5 and 6 may be respectively disposed at opposing positions on a plurality of blades 3 as in FIG. 2. However, in either case, the leakage prevention effect is limited.

SUMMARY OF THE DISCLOSURE

An object of the present disclosure is to provide a structure capable of mitigating leakage of working fluid through a clearance between an end of a blade tip and an inner circumferential surface of a stator by improving the shape of the end of the blade tip.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, there is provided a sealing structure for a blade tip. The structure may include a blade of a bucket mounted on an outer circumferential surface of a rotor disk coupled along a longitudinal direction to a rotor disposed inside a stator; and a tip seal having a multi-row structure formed on an end of the blade and provided to prevent working fluid from leaking through a clearance established between an inner circumferential surface of the stator and the end of the blade, wherein the tip seal comprises linear parts disposed at a predetermined angle relative to an axial direction of the rotor, each of the linear parts having a planarized end.

The linear parts may have different thicknesses varying from an outer side of the blade to a center point. The thicknesses of the linear parts may be gradually reduced from the outer side of the blade to the center point.

The tip seal may further include bend parts coupled with the respective linear parts and disposed at a predetermined angle relative to the axial direction of the rotor, each of the bend parts having a planarized end. A bend angle (θ) of each of the bend parts relative to the axial direction of the rotor may be an acute angle toward a direction opposite to an inflow direction of the working fluid. The bend angle (θ) may range from 65° to 85°.

The tip seal may further include a block protrusion disposed between the linear parts disposed in a plurality of rows and having a planarized end, the block protrusion being provided to form a fluid barrier between the end of the blade and the inner circumferential surface of the stator when the blade rotates.

The predetermined angle (α) of each of the linear parts relative to the rotating axis of the rotor may be an obtuse angle with respect to a rotation direction of the blade. The obtuse angle may range from 95° to 105°.

In accordance with another aspect of the present disclosure, a sealing structure for a blade tip may include a blade of a bucket mounted on an outer circumferential surface of a rotor disk coupled along a longitudinal direction to a rotor disposed inside a stator; and a tip seal having in a multi-row structure formed on an end of the blade and provided to prevent working fluid from leaking through a clearance established between an inner circumferential surface of the stator and the end of the blade, wherein the tip seal comprises first rounded parts disposed at a predetermined angle relative to an axial direction of the rotor, each of the first rounded parts having a rounded end.

The tip seal may further include second rounded parts coupled with the respective first rounded parts and disposed at a predetermined angle relative to the axial direction of the rotor, each of the second rounded parts having a rounded end. The first and second rounded parts may have different thicknesses varying from an outer side of the blade to a center point. The thicknesses of the first and second rounded parts may be gradually reduced from the outer side of the blade to the center point.

The tip seal may further include a rounded protrusion disposed between the first rounded parts disposed in a plurality of rows and having a rounded end, the rounded protrusion being provided to form a fluid barrier between the end of the blade and the inner circumferential surface of the stator when the blade rotates.

An angle ($\Phi$) of each of the second rounded parts at a predetermined angle relative to the axial direction of the rotor may be an acute angle toward a direction opposite to an inflow direction of the working fluid. The angle ($\Phi$) may range from 65° to 85°.

In accordance with another aspect of the present disclosure, a sealing structure for a blade tip may include a blade of a bucket mounted on an outer circumferential surface of a rotor disk coupled along a longitudinal direction to a rotor disposed inside a stator; and a tip seal having a multi-row structure formed on an end of the blade and provided to prevent working fluid from leaking through a clearance established between an inner circumferential surface of the stator and the end of the blade, wherein the tip seal comprises tapered parts disposed perpendicular relative to an axial direction of the rotor and tapered in a rotation direction of the rotor.

The tapered parts may have different thicknesses varying from an outer side of the blade to a center point. The thicknesses of the tapered parts may be gradually reduced from the outer side of the blade to the center point.

The tip seal may further include an inclined protrusion disposed between the tapered parts disposed in a plurality of rows and having an inclined end, the inclined protrusion being provided to form a fluid barrier between the end of the blade and the inner circumferential surface of the stator when the blade rotates.

In an embodiment, a gas turbine according to the present disclosure may include one of the above sealing structures. The gas turbine may further include a casing; a compressor section disposed in the casing at a front surface side into which working fluid is drawn, the compressor section being configured to compress the working fluid; a combustor disposed at a side of the casing and coupled with the compressor section, the combustor being configured to mix compressed working fluid with fuel and combust the mixture; a turbine section disposed at a rear surface side of the casing and coupled with the combustor, the turbine section being configured to produce power using combustion gas; a diffuser disposed in a rear end of the casing and coupled with the turbine section, the diffuser being configured to discharge working fluid out of the gas turbine; and a rotor configured to couple the compressor section with the turbine section.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIGS. 1 and 2 are diagrams illustrating structures of a contemporary sealing structure and blade tip;

FIG. 3 is a schematic side view of a sealing structure for a blade tip in accordance with one example of a first embodiment of the present disclosure;

FIG. 4 is a plan view of the tip seal shown in FIG. 3;

FIG. 5 is a schematic side view of a sealing structure for a blade tip in accordance with another example of the first embodiment of the present disclosure;

FIG. 6 is a plan view of the tip seal shown in FIG. 5;

FIG. 7 is a schematic side view of a sealing structure for a blade tip in accordance with yet another example of the first embodiment of the present disclosure;

FIG. 8 is a plan view of the tip seal shown in FIG. 7;

FIG. 9 is a schematic side view of a sealing structure for a blade tip in accordance with a second embodiment of the present disclosure;

FIG. 10 is a plan view of the tip seal shown in FIG. 9;

FIG. 11 is a schematic side view of a sealing structure for a blade tip in accordance with a third embodiment of the present disclosure;

FIG. 12 is a plan view of the tip seal shown in FIG. 11; and

FIG. 13 is a side sectional view illustrating an example of a gas turbine to which the present disclosure is applied.

DESCRIPTION OF SPECIFIC EMBODIMENTS

Terms or words used hereinafter should not be construed as having common or dictionary meanings, but should be construed as having meanings and concepts that comply with the technical spirit of the present disclosure on the basis of the principle that the inventor may appropriately define the concepts of the terms in order to best describe his or her disclosure. Accordingly, the following description and drawings illustrate exemplary embodiments of the present disclosure and do not fully represent the scope of the present disclosure. It would be understood by one of ordinary skill in the art that a variety of equivalents and modifications of the embodiments exist.

In the drawings, the width, length, thickness, etc. of each element may have been enlarged for convenience. Furthermore, when it is described that one element is disposed 'over' or 'on' the other element, one element may be disposed 'right over' or 'right on' the other element or a third element may be disposed between the two elements. The same reference numbers are used throughout the specification to refer to the same or like parts.

Hereinafter, embodiments of a sealing structure for a blade tip in accordance with the present disclosure will be described with reference to the accompanying drawings.

The configuration of a gas turbine 100 will be described with reference to the drawings before the description of the present disclosure.

Referring to FIG. 13, the gas turbine 100 may basically include a casing 200 which forms an appearance of the gas turbine 100, a compressor section 400 configured to compress air, a combustor 500 configured to combust air, a turbine section 600 configured to generate electricity using combustion gas, a diffuser 700 configured to discharge exhaust gas, and a rotor 300 which couples the compressor section 400 with the turbine section 600 to transmit rotating force.

External air is drawn into the compressor section 400 that thermodynamically corresponds to an upstream side of the gas turbine 100. The drawn external air is compressed through an adiabatic compression process. The compressed air is drawn into a combustor section and mixed with fuel, and then the mixture is combusted through a constant pressure combustion process. Combustion gas is drawn into the turbine section 600 corresponding to a downstream side of the gas turbine 100 and expanded through an adiabatic expansion process.

Based on an airflow direction, the compressor section 400 is disposed ahead of the casing 200, and the turbine section 600 is provided behind the casing 200.

A torque tube 320 for transmitting rotational torque generated from the turbine section 600 to the compressor section 400 is provided between the compressor section 400 and the turbine section 600.

The compressor section 400 is provided with a plurality (e.g., fourteen sheets) of compressor rotor disks 410. The compressor rotor disks 410 are coupled by a tie rod 310 such that they are not spaced apart from each other in an axial direction of the tie rod 310.

The compressor rotor disks 410 are arranged along the axial direction of the tie rod 310 passing through respective central portions of the compressor rotor disks 410. A flange (not shown) protruding in the axial direction is formed around an outer circumferential portion of each compressor rotor disk 410 and coupled to a neighboring rotor disk 410 so as to prevent the adjacent rotor disks 410 from rotating relative to each other.

A plurality of blades (or referred to as "buckets") 420 are radially coupled to an outer circumferential surface of each compressor rotor disk 410. Each of the blades 420 includes a dovetail (not shown) by which the blade 420 is coupled to the compressor rotor disk 410.

A dovetail coupling method may be classified into a tangential type and an axial type. This may be selected depending on a needed structure of the gas turbine to be used. In some cases, a coupling device other than the dovetail may be used to couple the compressor blade 420 to the compressor rotor disk 410.

Here, vanes (also referred to as "nozzles" and not shown), relative to which the compressor blades 420 rotate, may be mounted to a diaphragm (not shown) and disposed on an inner circumferential surface of the compressor section 400 of the casing 200.

The tie rod 310 is disposed passing through central portions of the plurality of compressor rotor disks 410. One end of the tie rod 310 is coupled to the compressor rotor disk 410 that is disposed at the most upstream side, and the other end is fixed to the torque tube 320.

The tie rod 310 is not limited to the structure proposed in the drawings and may be variously configured depending on the structure of the gas turbine 100. For example, a single tie rod 310 may be configured to pass through the central portions of the compressor rotor disks 410, a plurality of tie rods 310 may be arranged in a circumferential direction, or a combination of these is also possible.

Although not shown, a vane functioning as a guide vane may be installed in the compressor of the gas turbine at a position following the diffuser so as to adjust a flow angle of fluid to a designed flow angle, the fluid entering an entrance of the combustor after the pressure of the fluid has been increased. This vane is referred to as a deswirler.

The combustor 500 mixes introduced compressed air with fuel, combusts the mixture to generate high-temperature and high-pressure combustion gas having high energy, and increases, through a constant pressure combustion process, the temperature of the combustion gas to a heat resistant limit temperature at which the components of the combustor 500 and the turbine section 600 can withstand.

A combustion system of the gas turbine may include a plurality of combustors 500 arranged in the casing 200 formed in a cell shape. Each of the combustors 500 includes a burner including a fuel injection nozzle, etc., a combustor liner forming a combustion chamber, and a transition piece serving as a connector between the combustor 500 and the turbine section 600.

In detail, the liner provides a combustion space in which fuel discharged from the fuel injection nozzle is mixed with compressed air supplied from the compressor section 400 and then combusted. The liner includes a flame tube for providing the combustion space in which the fuel mixed with air is combusted, and a flow sleeve for forming an annular space enclosing the flame tube. The fuel injection nozzle is coupled to a front end of the liner, and an ignition plug is coupled to a sidewall of the liner.

The transition piece is connected to a rear end of the liner so as to transfer combustion gas combusted by the ignition plug toward the turbine section 600.

An outer wall of the transition piece is cooled by compressed air supplied from the compressor section 400 so as to prevent the transition piece from being damaged by high-temperature combustion gas.

To this end, the transition piece has cooling holes through which air can be injected into an internal space of the transition piece. Compressed air cools a main body in the transition piece through the cooling holes and then flows toward the liner.

The cooling air that has cooled the transition piece may flow through the annular space of the liner. Compressed air may be provided as cooling air from the outside of the flow sleeve through cooling holes provided in the flow sleeve, and collide with an outer wall of the liner.

Generally, in the turbine section 600, high-temperature and high-pressure combustion gas exiting the combustor 500 expands to apply impulsive force and reaction force to an impeller of the turbine section 600, thus generating mechanical energy.

Some of the mechanical energy obtained from the turbine section 600 is supplied as energy needed to compress air in the compressor section 400, and the remaining mechanical energy is used to drive a generator and produce electric power.

The turbine section 600 is formed of a plurality of stators and a plurality of rotors which are alternately arranged in a turbine casing, and is configured such that the rotors are driven by combustion gas so as to rotate an output shaft coupled to the generator.

For this operation, a plurality of turbine rotor disks 610 are provided in the turbine section 300. Each of the turbine rotor disks 610 basically has a form similar to that of the compressor rotor disk 410. That is, the turbine rotor disk 610 also includes a flange (not shown) provided for coupling with a neighboring turbine rotor disk, and a plurality of turbine blades (also referred to as "buckets") 620 which are radially provided. Each of the turbine blades 620 may also be coupled to the turbine rotor disk 610 in a dovetail coupling manner. As in the case of the compressor section 400, vanes (also referred to as "nozzles" and not shown), relative to which the turbine blades 620 rotate, may be mounted to a diaphragm (not shown) and disposed on an inner circumferential surface of the turbine section 600 of the casing 200.

In the gas turbine 100 having the above-mentioned configuration, introduced air is compressed in the compressor section 400, combusted in the combustor 500, transferred to the turbine section 600 to generate electricity, and then discharged to the atmosphere through the diffuser 700.

Here, the torque tube 320, the compressor rotor disks 410, the compressor blades 420, the turbine rotor disks 610, the turbine blades 620, the tie rod 310, and so forth are rotational components, and may be integrally referred to as the rotor 300 or a rotational body. The casing 200, the vanes (not shown), the diaphragm (not shown), and so forth are irrotational components, and may be integrally referred to as a stator or a stationary body.

The structure of one general example of the gas turbine is as described above. Hereinafter, the present disclosure that is applied to such a gas turbine will be described.

First Embodiment

FIGS. 3-8 relate to a first embodiment of the present disclosure.

Referring to FIGS. 3 and 4, in an example of the first embodiment of the sealing structure 10 for the blade tip in accordance with the present disclosure, the sealing structure 10 may include a blade 30 of a bucket, and a tip seal 40.

A plurality of buckets may be provided along an outer circumferential surface of a rotor disk which is coupled along a longitudinal direction to a rotor disposed inside a stator 20. Each bucket may include a blade 30.

The tip seal 40 may have a multi-row structure provided on an end of the blade 30 to prevent working fluid from leaking through a clearance established between the inner circumferential surface of the stator 20 and the end of the blade 30.

The tip seal 40 may include linear parts 41, 42, and 43 each of which has a planarized end facing the stator 20. The linear parts 41, 42, and 43 are provided on the end of the blade 30 and may be oriented with respect to the direction of the rotating axis of a rotor. That is, linear parts 41, 42, and 43 may be disposed so as to have a predetermined angle α relative to the axial direction of the rotor. The predetermined angle α may be 90° such that the linear parts 41, 42, and 43 are perpendicular relative to the axial direction of the rotor, or may be an obtuse angle (described later).

In this example of the first embodiment of the present disclosure, as shown in FIG. 3, each of the linear parts 41, 42, and 43 may have an equal thickness D1.

As shown in FIG. 4, the linear parts 41, 42, and 43 are disposed on the end of the blade 30 in a direction perpendicular to a flow direction of working fluid G and function to mitigate leakage of the working fluid G. As such, the linear parts 41, 42, and 43 form a multi-ply structure, thus enhancing the effect of preventing leakage of the working fluid G compared to that of a contemporary technique.

Furthermore, taking into account a rotation direction R of the bucket, the linear parts 41, 42, and 43 may be disposed on the end of the blade 30 at the predetermined angle α relative to the axial direction of the rotor, i.e., based on an inflow direction of the working fluid G. In this case, the predetermined angle α may be determined to be an obtuse angle relative to the axial direction of the rotor so as to return the working fluid G in a direction opposite to the inflow direction.

It may be appropriate for the obtuse angle of the linear parts 41, 42, and 43 to be set within a range from 95° to 105° in order to minimize occurrence of turbulent currents due to returning of the working fluid G in the reverse direction.

Next, referring to FIGS. 5 and 6, in another example of the first embodiment of the present disclosure, the linear parts 41, 42, and 43 may be formed such that their thicknesses vary from an outer side of the blade 30 to a center point. In the present disclosure, the linear parts 41, 42, and 43 may be configured such that the thicknesses are gradually reduced from the outer side of the blade 30 to the center point.

Since the effect of preventing leakage of working fluid is greatest on opposite sides of the blade 30, a thickness D1 of the linear part 41 that is disposed on the corresponding portion is set to a largest value. Since the effect of preventing leakage of working fluid is reduced near the center point of the blade 30, the linear parts 42 and 43 are configured such that thicknesses D2 and D3 of the linear parts 42 and 43 are gradually reduced, thus making it possible to reduce the weight of the blade 30. Thus, the above configuration achieves weight reduction as well as an enhanced effect of preventing the leakage of working fluid G.

This example of the first embodiment of the present disclosure may further include block protrusions 45. The block protrusions 45 are disposed between the linear parts 41, 42, and 43 that are arranged in a plurality of rows. Each block protrusion 45 has a planarized end. The block protrusions 45 function to form a fluid barrier between the end of the blade 30 and the inner circumferential surface of the stator 20 when the blade 30 rotates.

That is, when the blade 30 of the bucket rotates, working fluid G that passes through the linear parts 41, 42, and 43 is pushed outward once per each turn by the block protrusions 45, thus indirectly forming fluid barriers. The fluid barriers induce an additional leakage prevention function to be provided in space between the linear parts 41, 42, and 43.

Although the block protrusions 45 may be disposed between the linear parts 41, 42, and 43 at different positions relative to the axial direction of the rotor, the present disclosure is not limited thereto. In the case where the block protrusions 45 are disposed at different positions, the sealing effect may be further enhanced because the fluid barriers are formed with time intervals.

Next, referring to FIGS. 7 and 8, in yet another example of the first embodiment of the present disclosure, the tip seal 40 may further include bend parts 47, which are connected to the respective linear parts 41, 42, and 43 and oriented at a predetermined angle θ relative to the axial direction of the rotor, and each of which has a planarized end.

Working fluid G that passes through the linear parts 41, 42, and 43 is pushed by the bend parts 47 in a direction opposite to the flow direction when the blade 30 rotates. Due to such continuous push operations, the working fluid G returns in the reverse direction.

Here, it is preferable that the angle at which each bend part 47 is formed be an acute angle relative to the axial direction of the rotor. It may be appropriate for the bend angle θ to be within a range from 65° to 85°. In the case where the bend angle θ is less than 65°, shock friction on a bend surface is increased, thus acting as a factor of disrupting the rotation of the blade 30. In the case where the bend angle θ is greater than 85°, the performance of returning the working fluid G in the reverse direction is excessively reduced, whereby the bend part 47 may not properly perform its own function.

Second Embodiment

FIGS. 9 and 10 relate to a first embodiment of the present disclosure.

Referring to FIGS. 9 and 10, in the second embodiment of the sealing structure 10 for the blade tip in accordance with the present disclosure, the sealing structure 10 may include a blade 30 of a bucket, and a tip seal 60.

A plurality of buckets may be provided along an outer circumferential surface of a rotor disk which is coupled along a longitudinal direction to a rotor disposed inside a stator 20. Each bucket may include a blade 30.

The tip seal 60 may be disposed in a multi-row structure on an end of the blade 30. The tip seal 60 may be provided to prevent working fluid from leaking through a clearance between the inner circumferential surface of the stator 20 and the end of the blade 30.

The tip seal 60 may include first rounded parts 61, 62, and 63 which are disposed perpendicular relative to the axial direction of the rotor, and each of which has a rounded end, and second rounded parts 67 which are connected with the respective first rounded parts 61, 62, and 63 and disposed at a predetermined angle relative to the axial direction of the rotor, and each of which has a rounded end.

In the second embodiment of the present disclosure, the first rounded parts 61, 62, and 63 and the second rounded parts 67 may be configured such that their thicknesses vary from an outer side of the blade 30 to a center point. In the present disclosure, the first rounded parts 61, 62, and 63 and the second rounded parts 67 may be configured such that their thicknesses are gradually reduced from the outer side of the blade 30 to the center point.

Since the effect of preventing leakage of working fluid is greatest on opposite sides of the blade 30, a thickness D1 of the first rounded part 61 that is disposed on the corresponding portion is set to a largest value. Since the effect of preventing leakage of working fluid is reduced near the center point of the blade 30, the first rounded parts 62 and 63 are configured such that thicknesses D2 and D3 of the first rounded parts 62 and 63 are gradually reduced, thus making it possible to reduce the weight of the blade 30. This structure is also applied to the second rounded parts 67 in the same manner. Thus, the above configuration achieves weight reduction as well as an enhanced effect of preventing the leakage of working fluid G.

The second embodiment of the present disclosure may further include rounded protrusions 65. The rounded protrusions 65 are disposed between the first rounded parts 61, 62, and 63 that are arranged in a plurality of rows. Each rounded protrusion 65 has a rounded end. The rounded protrusions 65 function to form a fluid barrier between the end of the blade 30 and the inner circumferential surface of the stator 20 when the blade 30 rotates.

When the blade 30 of the bucket rotates, working fluid G that passes through the first rounded parts 61, 62, and 63 is pushed outward once per each turn by the rounded protrusions 65, thus indirectly forming fluid barriers. The fluid barriers induce an additional leakage prevention function to be provided in space between the first rounded parts 61, 62, and 63.

Although the rounded protrusions 65 may be disposed between the first rounded parts 61, 62, and 63 at different positions relative to the axial direction of the rotor, the present disclosure is not limited thereto. In the case where the rounded protrusions 65 are disposed at different positions, the sealing effect may be further enhanced because the fluid barriers are formed with time intervals.

Furthermore, to achieve the purpose of weight reduction, each rounded protrusion 65 may be configured such that the height is gradually reduced in the flow direction of working fluid G.

In detail, a contact surface of the rounded protrusion 65 that is adjacent to an upstream side based on the inflow direction of the working fluid G and makes contact with the first rounded part 61, 62, or 63 has a relatively large height so that the fluid barrier can be comparatively intensively formed. A contact surface of the rounded protrusion 65 that is adjacent to a downstream side based on the inflow direction of the working fluid G and makes contact with the first rounded part 62 or 63 has a relatively small height to take into account the purpose of weight reduction rather than formation of the fluid barrier.

In the second embodiment of the present disclosure, each second rounded part 67 is disposed at a predetermined angle Φ relative to the axial direction of the rotor. Working fluid G that passes through the first rounded parts 61, 62, and 63 is pushed by the second rounded parts 67 in a direction opposite to the flow direction when the blade 30 rotates. Due to such continuous push operations, the working fluid G returns in the reverse direction.

Here, it is preferable that the angle at which each second rounded part 67 is formed be an acute angle based on the axial direction of the rotor. It may be appropriate for the angle Φ to be formed within a range from 65° to 85°. In the case where the angle Φ is less than 65°, shock friction on a rounded surface is increased, thus acting as a factor of disturbing the rotation of the blade 30. In the case where the angle Φ is greater than 85°, the performance of returning the working fluid G in the reverse direction is excessively reduced, whereby the second rounded part 67 may not properly perform its own function.

Third Embodiment

FIGS. 9 and 10 relate to a first embodiment of the present disclosure.

Referring to FIGS. 11 and 12, in the third embodiment of the sealing structure 10 for the blade tip in accordance with the present disclosure, the sealing structure 10 may include a blade 30 of a bucket, and a tip seal 70.

A plurality of buckets may be provided along an outer circumferential surface of a rotor disk which is coupled along a longitudinal direction to a rotor disposed inside a stator 20. Each bucket may include a blade 30.

The tip seal 70 may be disposed in a multi-row structure on an end of the blade 30. The tip seal 70 may be provided to prevent working fluid from leaking through a clearance between the inner circumferential surface of the stator 20 and the end of the blade 30.

Here, the tip seal 70 may include tapered parts 71, 72, and 73 which are disposed perpendicular relative to the axial direction of the rotor and are tapered in a rotation direction of the rotor.

In the third embodiment of the present disclosure, the tapered parts 71, 72, and 73 may be configured such that their thicknesses vary from an outer side of the blade 30 to a center point. In the present disclosure, the tapered parts 71, 72, and 73 may be configured such that their thicknesses are gradually reduced from the outer side of the blade 30 to the center point.

Since the effect of preventing leakage of working fluid is greatest on opposite sides of the blade 30, a thickness D1 of the tapered part 71 that is disposed on the corresponding portion is set to a largest value. Since the effect of preventing leakage of working fluid is reduced on the center point of the blade 30, the tapered parts 72 and 73 are configured such that thicknesses D2 and D3 of the tapered parts 72 and 73 are gradually reduced, thus making it possible to reduce the weight of the blade 30. Thus, the above configuration achieves weight reduction as well as an enhanced effect of preventing the leakage of working fluid G.

The third embodiment of the present disclosure may further include inclined protrusions 75. The inclined protrusions 75 are disposed between the tapered parts 71, 72, and 73 that are arranged in a plurality of rows. Each inclined protrusion 75 has an inclined end. The inclined protrusions 75 function to form a fluid barrier between the end of the blade 30 and the inner circumferential surface of the stator 20 when the blade 30 rotates.

When the blade 30 of the bucket rotates, working fluid G that passes through the tapered parts 71, 72, and 73 is pushed outward once per each turn by the inclined protrusions 75, thus indirectly forming fluid barriers. The fluid barriers induce an additional leakage prevention function to be provided in space between the tapered parts 71, 72, and 73.

Although the inclined protrusions 75 may be disposed between the tapered parts 71, 72, and 73 at different positions based on the axial direction of the rotor, the present disclosure is not limited thereto. In the case where the inclined protrusions 75 are disposed at different positions, the sealing effect may be further enhanced because the fluid barriers are formed with time intervals.

Furthermore, to achieve the purpose of weight reduction, each inclined protrusion 75 may be configured such that the height is gradually reduced in the flow direction of working fluid G.

In detail, a contact surface of the inclined protrusion 75 that is adjacent to an upstream side based on the inflow direction of the working fluid G and makes contact with the tapered part 71, 72, or 73 has a relatively large height so that the fluid barrier can be comparatively intensively formed. A contact surface of the inclined protrusion 75 that is adjacent to a downstream side based on the inflow direction of the working fluid G and makes contact with the tapered part 72 or 73 has a relatively small height to take into account the purpose of weight reduction rather than formation of the fluid barrier.

A rotational body in accordance with the present disclosure may include a bucket including the sealing structure 10 for the blade tip, and a rotor including a plurality of rotor disks, which are disposed in a plurality of rows, and each of which is provided with a plurality of buckets mounted along an outer circumferential surface of the rotor disk.

The gas turbine in accordance with the present disclosure may include a casing 200, a compressor section 400, a combustor 500, a turbine section 600, a diffuser 700, and the rotor 300. The compressor section 400 may be disposed in the casing 200 at a front surface side into which working fluid is drawn, and may be configured to compress the working fluid. The combustor 500 may be disposed at a side of the casing 200, be coupled with the compressor section 400, and be configured to mix compressed working fluid with fuel and combust the fuel mixture. The turbine section 600 may be disposed at a rear surface side of the casing 200, be coupled with the combustor 500, and be configured to produce power using combustion gas. The diffuser 700 may be disposed in a rear end of the casing 200, be coupled with the turbine section 600, and be configured to discharge working fluid out of the gas turbine. The rotor 300 may couple the compressor section 400 with the turbine section 600.

In accordance with the present disclosure, an end of a blade tip is designed in various shapes so that leakage of working fluid through a clearance between the end of the blade tip and an inner circumferential surface of a stator may be mitigated.

As above, specific embodiments of the sealing structure for the blade tip have been described. It will be apparent to those skilled in the art that various changes and modifications may be made without departing from the spirit and scope of the disclosure as defined in the appended claims.

What is claimed is:

1. A sealing structure for a blade tip, comprising:
    a blade of a bucket mounted on an outer circumferential surface of a rotor disk coupled along a longitudinal direction to a rotor disposed inside a stator; and
    a tip seal having a multi-row structure formed on an end of the blade and provided to prevent working fluid from leaking through a clearance established between an inner circumferential surface of the stator and the end of the blade,
    wherein the tip seal comprises:
        linear parts disposed at a predetermined angle relative to an axial direction of the rotor, each of the linear parts having a planarized end, and
        an inclined protrusion disposed between the linear parts disposed in a plurality of rows and having an inclined end, the inclined protrusion being provided to form a fluid barrier between the end of the blade and the inner circumferential surface of the stator when the blade rotates,
    wherein a height of the inclined protrusion is gradually reduced in a flow direction of working fluid.

2. The sealing structure according to claim 1, wherein a thicknesses of the linear parts are varied from the outer side of the blade to a center point of the blade.

3. The sealing structure according to claim 1, wherein the tip seal further comprises bend parts coupled with the respective linear parts and disposed at a predetermined angle relative to the axial direction of the rotor, each of the bend parts having a planarized end.

4. The sealing structure according to claim 3, wherein a bend angle (θ) of each of the bend parts relative to the axial direction of the rotor is an acute angle toward a direction opposite to an inflow direction of the working fluid.

5. The sealing structure according to claim 4, wherein the bend angle (θ) ranges from 65° to 85°.

6. The sealing structure according to claim 1, wherein the predetermined angle (α) of each of the linear parts relative to the rotating axis of the rotor is an obtuse angle with respect to a rotation direction of the blade.

7. The sealing structure according to claim 6, wherein the obtuse angle ranges from 95° to 105°.

8. A sealing structure for a blade tip, comprising:
    a blade of a bucket mounted on an outer circumferential surface of a rotor disk coupled along a longitudinal direction to a rotor disposed inside a stator; and a tip seal having in a multi-row structure formed on an end of the blade and provided to prevent working fluid from leaking through a clearance established between an inner circumferential surface of the stator and the end of the blade, wherein the tip seal comprises:

first rounded parts disposed at a predetermined angle relative to an axial direction of the rotor, each of the first rounded parts having a rounded end, and a rounded protrusion disposed between the first rounded parts disposed in a plurality of rows and having a rounded end, the rounded protrusion being provided to form a fluid barrier between the end of the blade and the inner circumferential surface of the stator when the blade rotates, wherein a height of the rounded protrusion is gradually reduced in a flow direction of working fluid.

9. The sealing structure according to claim 8, wherein the tip seal further comprises second rounded parts coupled with the respective first rounded parts and disposed at a predetermined angle relative to the axial direction of the rotor, each of the second rounded parts having a rounded end.

10. The sealing structure according to claim 9, wherein the first and second rounded parts have different thicknesses varying from an outer side of the blade to a center point of the blade.

11. The sealing structure according to claim 10, wherein the thicknesses of the first and second rounded parts are gradually reduced from the outer side of the blade to the center point of the blade.

12. The sealing structure according to claim 9, wherein an angle ($\Phi$) of each of the second rounded parts at a predetermined angle relative to the axial direction of the rotor is an acute angle toward a direction opposite to an inflow direction of the working fluid.

13. The sealing structure according to claim 12, wherein the angle ($\Phi$) ranges from 65° to 85°.

14. A sealing structure for a blade tip, comprising:

a blade of a bucket mounted on an outer circumferential surface of a rotor disk coupled along a longitudinal direction to a rotor disposed inside a stator; and a tip seal having a multi-row structure formed on an end of the blade and provided to prevent working fluid from leaking through a clearance established between an inner circumferential surface of the stator and the end of the blade, wherein the tip seal comprises:

tapered parts disposed perpendicular relative to an axial direction of the rotor and tapered in a rotation direction of the rotor, and an inclined protrusion disposed between the tapered parts disposed in a plurality of rows and having an inclined end, the inclined protrusion being provided to form a fluid barrier between the end of the blade and the inner circumferential surface of the stator when the blade rotates, wherein a height of the inclined protrusion is gradually reduced in a flow direction of working fluid.

15. The sealing structure according to claim 14, wherein a thicknesses of the tapered parts are varied from the outer side of the blade to a center point of the blade.

* * * * *